(12) United States Patent
Wirbeleit et al.

(10) Patent No.: US 8,365,519 B2
(45) Date of Patent: Feb. 5, 2013

(54) CHARGING DEVICE WITH EXHAUST GAS TEMPERATURE CONTROL DEVICE

(75) Inventors: Friedrich Wirbeleit, Esslingen (DE); Guenther Vogt, Holzkirchen (DE); Uwe Hammer, Hausham (DE); Bodo Becker, Valley (DE)

(73) Assignee: Robert Bosch GmbH, Stuttgart (DE)

( * ) Notice: Subject to any disclaimer, the term of this patent is extended or adjusted under 35 U.S.C. 154(b) by 825 days.

(21) Appl. No.: 12/282,964

(22) PCT Filed: Feb. 6, 2007

(86) PCT No.: PCT/EP2007/051090
§ 371 (c)(1),
(2), (4) Date: Mar. 5, 2009

(87) PCT Pub. No.: WO2007/104613
PCT Pub. Date: Sep. 20, 2007

(65) Prior Publication Data
US 2010/0011761 A1    Jan. 21, 2010

(30) Foreign Application Priority Data
Mar. 15, 2006   (DE) .......................... 10 2006 011 889

(51) Int. Cl.
*F02D 23/00* (2006.01)
*F02B 33/00* (2006.01)

(52) U.S. Cl. ............................. 60/304; 60/602; 60/600

(58) Field of Classification Search ................. 60/605.2, 60/600–603, 298, 320, 321, 304
See application file for complete search history.

(56) References Cited

U.S. PATENT DOCUMENTS

| 3,747,346 | A * | 7/1973 | Onoda et al. ..................... 60/286 |
| 4,186,694 | A | 2/1980 | Koseki |
| 4,276,758 | A | 7/1981 | Coman et al. |
| 6,216,458 | B1 * | 4/2001 | Alger et al. .................. 60/605.2 |
| 6,637,204 | B2 * | 10/2003 | Ellmer et al. .................... 60/606 |
| 7,131,320 | B2 * | 11/2006 | Weinowski et al. ........ 73/114.75 |
| 2002/0083700 | A1 * | 7/2002 | Ellmer et al. ................... 60/278 |
| 2004/0109759 | A1 | 6/2004 | Korner |
| 2006/0283187 | A1 * | 12/2006 | Broadbent ...................... 60/600 |

FOREIGN PATENT DOCUMENTS

| DE | 299 09 018 | 9/2000 |
| DE | 100 22 052 | 3/2001 |
| DE | 203 11 703 | 11/2003 |
| EP | 1 275 832 | 1/2003 |

(Continued)

OTHER PUBLICATIONS

International Search Report, PCT/EP2007/051090, dated May 16, 2007.

*Primary Examiner* — Quyen Leung
*Assistant Examiner* — Leda Pham
(74) *Attorney, Agent, or Firm* — Kenyon & Kenyon LLP (57) ABSTRACT

In a charging device for an internal combustion engine, the charging device has at least one first line for the intake of fresh air, having at least one air-gap-insulated exhaust-carrying component. This is assigned to an outlet side of the internal combustion engine. At least one regulating element for distributing an exhaust gas stream, and at least one regulating element for distributing a pre-compressed fresh air stream is provided. The air-gap insulated exhaust-carrying component has an outer chamber, through which a controllable stream of fresh air flows.

8 Claims, 4 Drawing Sheets

FOREIGN PATENT DOCUMENTS

| | | |
|---|---|---|
| EP | 1 384 857 | 1/2004 |
| EP | 1 426 557 | 6/2004 |
| JP | 54-137394 | 9/1979 |
| JP | 56-55716 | 5/1981 |
| JP | 2004-84480 | 3/2004 |
| JP | 2005-220778 | 8/2005 |
| WO | WO 2004090305 A1 * | 10/2004 |
| WO | WO 2007/104613 | 9/2007 |

* cited by examiner

CHARGING DEVICE WITH EXHAUST GAS TEMPERATURE CONTROL DEVICE

FIELD OF THE INVENTION

The present invention relates to a charging device with an exhaust gas temperature control device.

BACKGROUND INFORMATION

Both in the case of self-ignition internal combustion engines and in the case of spark-ignition internal combustion engines, more and more vehicles are being equipped with a charging device, primarily in the form of exhaust gas turbochargers, in order to obtain greater engine power for the same engine size. With both types of internal combustion engine mentioned, the engine power attainable is limited, however, by the permissible degree of heating of the components, especially the permissible degree of heating of the material from which the exhaust manifold, the exhaust gas turbocharger and any necessary regulating valves and exhaust gas lines is made. To reduce the temperature of the exhaust gas it is customary in the case of spark-ignition internal combustion engines to run with an air ratio λ below the stoichiometric ratio. In some cases, the air ratio is in the order of magnitude of 0.7, which, however, in the upper load range of the internal combustion engine, results on the one hand in increased fuel consumption and on the other hand in increased CO emission. In view of the more stringent exhaust gas standards to be expected both in Europe and in the USA, increased CO emission is not acceptable.

Certain air-gap-insulated exhaust manifolds are conventional. These are normally used, however, to prevent cooling of the exhaust gas stream in the lower load range, that is, in the lower engine speed range, of an internal combustion engine whether it be a spark-ignition or a self-ignition internal combustion engine. This on the one hand has the effect that the efficiency of the exhaust gas turbocharger increases and on the other hand ensures that the catalytic converter enters the range of the optimum operating temperature as quickly as possible.

SUMMARY

Example embodiments of the present invention use exhaust-carrying components in an internal combustion engine, whether it be a self-ignition or a spark-ignition internal combustion engine, as a thermal insulation arrangement, by virtue of air insulation, both in the cold-start phase and in the warm-up phase and in low load operation, and to pass charge air through those components at higher temperatures and in that manner reduce the thermal load on the material of exhaust-carrying components.

In accordance with example embodiments of the present invention, a two-fold use of exhaust-carrying components, for example air-gap-insulated exhaust-carrying components, is provided, which on the one hand in the low load range of the internal combustion engine with static air fill has the effect of insulating the exhaust-carrying components and on the other hand, at higher loads of the internal combustion engine, has cold charge air passed through it, whereby a reduction in the temperature of the exhaust gas is achieved.

The air required for combustion passes via the air filter and an air mass meter to the charging device, which is preferably a one-stage or multi-stage exhaust gas turbocharger. In the compressor part of the charging device, the air is compressed and passes via a line to a regulating valve. The compressor part of the exhaust gas turbocharger is driven by the exhaust gas stream of the internal combustion engine, which reaches the charging device via the exhaust-carrying components and a further line. In order for high dynamics of the charging device to be maintained, it is configured in such a manner that it exhibits a sufficient response also at low engine speeds of the internal combustion engine and with the resulting small quantity of exhaust gas. To prevent a situation in which, in the upper engine speed range, the quantity of exhaust gas becomes too great and the charging device enters the "saturation range", that is to say, when the pressure upstream of the charging device rises without more air being conveyed into the intake train, in the upper engine speed range the excess quantity of exhaust gas is directed via a wastegate past the turbine part directly into the exhaust train of the internal combustion engine. In addition, the wastegate offers the possibility of regulating the required charge pressure, which is important primarily in the case of spark-ignition internal combustion engines.

When the regulating valve is fully open, the air passes via a charge air cooler and a throttle valve, which is required merely in the case of spark-ignition internal combustion engines, into the intake train and, from there, to the individual cylinder of the internal combustion engine, which is normally a multi-cylinder internal combustion engine. Cooling of the exhaust gas and of the exhaust-carrying components assigned to the internal combustion engine does not yet take place. If, in the upper load range, cooling of the exhaust-carrying components becomes necessary owing to the high temperature of the exhaust gas and the associated heating of the exhaust manifold, the mentioned regulating valve is partially closed. As a result, a drop in pressure occurs inside the regulating valve, so that there is a higher pressure upstream of the regulating valve than downstream of the regulating valve. That pressure difference Δp causes air to pass via a line to the outer chamber of the exhaust-carrying components. The exhaust-carrying components may, for example, be double-walled, a gap which forms the mentioned outer chamber being formed between the inner wall and the outer wall. The air entering the outer chamber thus flows around the inner wall of the exhaust-carrying components and cools them. In the process, the air is heated and passes via a line to the charge air cooler and is cooled there in order to pass from there, via the intake pipe, to the cylinder intake. By way of the position of the regulating valve it is possible to control how great is the quantity of air passing via the outer chamber of the exhaust-carrying components and thus the degree of cooling of the exhaust gas stream.

In further exemplary embodiments in accordance with the present invention, after leaving the outer chamber of the exhaust-carrying components the air passes into the exhaust train of the internal combustion engine and is preferably introduced downstream of the catalytic converter. Thus, the air used for cooling the exhaust gas is not available to the internal combustion engine as combustion air and therefore the charge air cooler may be smaller since in this exemplary embodiment the air heated by cooling of the exhaust-carrying components does not need to be cooled. The solution proposed may also be used in the case of a two-stage charging device having two turbochargers arranged in series. In that case, one turbocharger will be larger than the turbocharger downstream of it. At low engine speeds and with a small quantity of exhaust gas, a regulating flap valve is closed with the result that the stream of exhaust gas is directed in its entirety via the smaller turbocharger. When the quantity of exhaust gas increases, a regulating valve is closed with the result that the exhaust gas also flows via the larger turbocharger. By way of the position of the regulating flap valve it is possible to adjust the distribution of the exhaust gas in any desired manner. The fresh air passes via the air filter to the larger of the two turbochargers and, from there, to the smaller turbocharger, the hot-film air mass meter, the charge air cooler and a throttle valve and into the intake manifold. In the case of a large quantity of air, the pressure upstream of the smaller turbocharger rises to an extent such that a bypass valve opens and the air flows past the small turbocharger directly to the air mass meter. If cooling of the exhaust-carrying components becomes necessary, a further regulating valve is opened and a certain quantity of air passes to the exhaust-carrying components, for example the air-gap-insulated exhaust-carrying components.

In a further example embodiment, a separate turbocharger may be employed to deliver the cooling air. The turbocharger required for cooling is disposed downstream of the wastegate. To obtain good response dynamics, the compressor is made as small as possible. This results in the quantity of exhaust gas in the upper load and engine speed range being too high. The excess quantity is then directed via a wastegate past the exhaust gas turbocharger and is used to compress the cooling air. The quantity of exhaust gas and thus also the quantity of cooling air delivered may be regulated by the position of the wastegate. The air mass meter is disposed between the two turbochargers, which reduces the risk of fouling.

Instead of the separate turbocharger, a suction jet pump may be used.

Example embodiments of the present invention are described in greater detail hereinafter with reference to the drawings.

DETAILED DESCRIPTION

Figure 1:
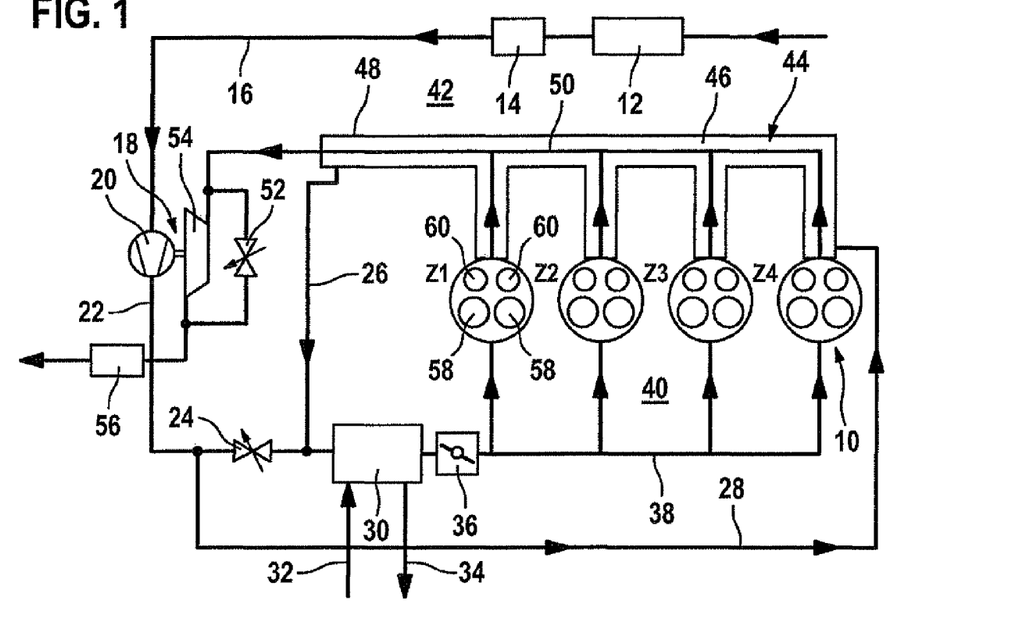
FIG. 1 shows a first example embodiment having a one-stage charging device with wastegate and a cooling air line for air-gap-insulated exhaust-carrying components, which cooling air line branches off upstream of a regulating valve.

There will be seen from the illustration shown in FIG. 1 a flow diagram of a charging device of one-stage construction with a cooling air branch downstream of the compressor part of the charging device.

As shown in the flow diagram illustrated in FIG. 1, ambient air flows toward an air filter 12 of an internal combustion engine 10. Internal combustion engine 10 may be either a self-ignition internal combustion engine or a spark-ignition internal combustion engine. Arranged downstream of air filter 12 is an air mass meter 14. From the latter the air flows via a first line 16 to a compressor part 20 of a charging device 18 which, in this example embodiment, is of a one-stage construction. Once compressed, the compressed fresh air flows via a second line 22 to a first regulating valve 24. Downstream of first regulating valve 24 there is the entry point of a third line 26, while a fourth line 28 branches off upstream of first regulating valve 24.

Depending on the position of first regulating valve 24, compressed air flows via a fourth line 28 to exhaust-carrying components 44 such as, for example, an exhaust manifold. Exhaust-carrying components 44 include an outer chamber 46 delimited by an outer wall 48 and by an inner wall 50. The pre-compressed air flows into that outer chamber 46. First regulating valve 24 is in this case actuated in such a manner that, in the upper load range of internal combustion engine 10, it is operated in the closing direction but is not completely closed. This results in a pressure drop inside first regulating valve 24, so that there is a higher pressure upstream of first regulating valve than downstream thereof. That pressure difference causes the pre-compressed air to flow via fourth line 28 in outer chamber 46 to exhaust-carrying component 44. The pre-compressed air flowing through outer chamber 46 cools exhaust-carrying component 44, during which process the pre-compressed air is heated accordingly. Via third line 26, the air used for cooling arrives upstream of charge air cooler 30, which has an inlet 32 and an outlet 34 for a cooling medium. The charge air that has passed through regulating valve 24 also arrives at charge air cooler 30. The two air streams are cooled in charge air cooler 60 and, after passing through a throttle valve 36, enter a fifth line 38. Branching off fifth line 38 there is a number of lines corresponding to the number of cylinders Z1, Z2, Z3 and Z4 of internal combustion engine 10. The pre-compressed, cooled fresh air enters individual cylinders Z1, Z2, Z3, Z4 via intake valves 38 provided on an intake side 40 of internal combustion engine 10. The exhaust gas obtained in individual cylinders Z1, Z2, Z3, Z4 following the combustion process is passed at an outlet side 42 into air-gap-insulated exhaust-carrying component 44. Since the pre-compressed fresh air stream which branched off upstream of first regulating valve 24 passes through exhaust-carrying component 44, inner wall 50 of exhaust-carrying component 44 is cooled, so that the material from which air-gap-insulated exhaust-carrying component 44 is made is not subjected to impermissibly high temperature stresses. As mentioned above, the portion of the pre-compressed fresh air stream passed via fourth line 28 into outer chamber 46 and being heated flows toward charge air cooler 30 via third line 26.

The cooled exhaust gas passing through exhaust-carrying component 44 flows toward a turbine part 54 of charging device 18. Connected in parallel to turbine part 54 of charging device 18 there is a wastegate 52. Charging device 18 is configured such that the dynamics are sufficient also at lower engine speeds of turbine part 54 of charging device 18 and such that turbine part 54 offers sufficiently high dynamics also at low engine speeds. To avoid a situation in which, in the upper load and engine speed range of the internal combustion engine, the quantity of exhaust gas becomes too high and the charging device 18 enters the "saturation range" in which the pressure upstream of turbine part 54 rises sharply without more air entering the intake train, in that operating range the excess quantity of exhaust gas is directed via wastegate 52 past turbine part 54 directly into the exhaust train of internal combustion engine 10. Using wastegate 52 it is possible to regulate the required charge pressure, above all in spark-ignition internal combustion engines. The portion of the exhaust gas stream directed via turbine part 54 of charging device 18 and the portion of the exhaust gas stream directed via wastegate 52 are fed to a catalytic converter 56 in the exhaust train of internal combustion engine 10.

Figure 2:
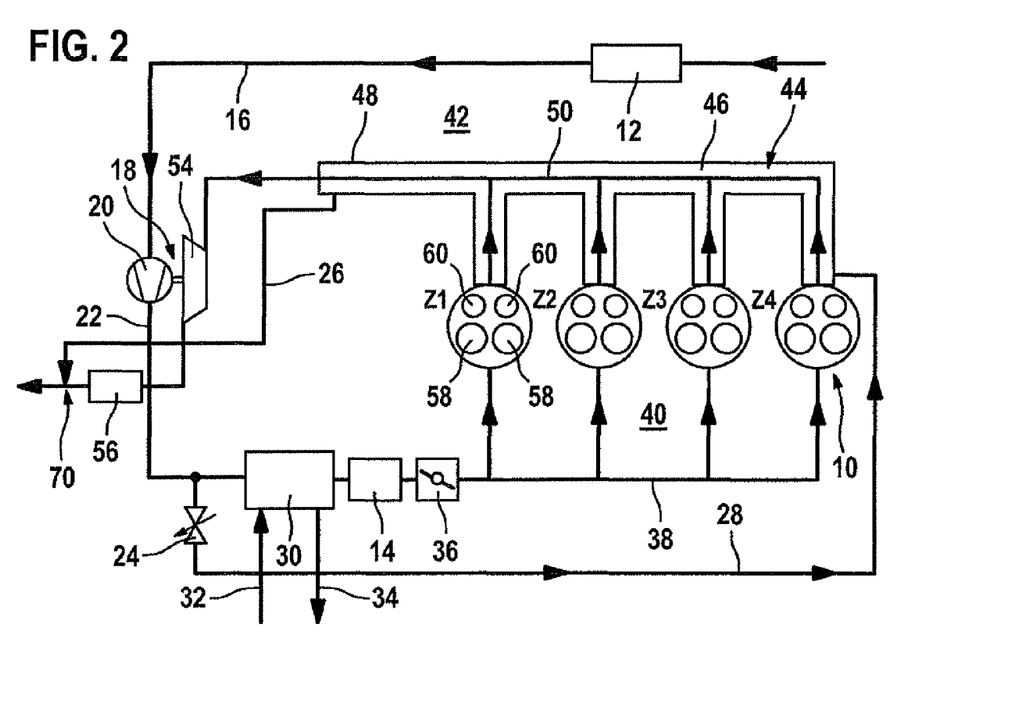
FIG. 2 is a flow diagram of a further example embodiment having a one-stage charging device, with the quantity of cooling air fed to the exhaust-carrying components being introduced downstream of the catalytic converter.

FIG. 2 shows a further example embodiment of the flow diagram as illustrated in FIG. 1, with modified direction of the flow of the heated, pre-compressed fresh air coming from the exhaust-carrying component.

In contrast to the flow diagram illustrated in FIG. 1, in the example embodiment shown in the flow diagram of FIG. 2 air mass meter 14 is disposed downstream of charge air cooler 30. In addition, as a modification of the flow diagram illustrated in FIG. 1, third line 26 discharges into the exhaust train of internal combustion engine 10 downstream of catalytic converter 56 at an entry point 70. In the case of the example embodiment illustrated in FIG. 2, it is not a closed system that is involved, but rather, after the pre-compressed fresh air leaves outer chamber 46 of air-gap-insulated exhaust-carrying component 44 it is introduced into the exhaust train at entry point 70 since here there is a lower pressure in the exhaust train. In that manner, air-side charge pressure regulation is implemented, in which the charge pressure is regulated by the release of fresh air downstream of charging device 18.

In this example embodiment, the portion of the pre-compressed fresh air that is used to cool the air-gap-insulated exhaust manifold is no longer available to internal combustion engine 10 as combustion air. Charge air cooler 30 may therefore be smaller in comparison with the example embodiment illustrated in FIG. 1, since the air that is heating by cooling of air-gap-insulated exhaust-carrying component 44 does not have to be cooled but may be fed into the exhaust train of the internal combustion engine immediately downstream of catalytic converter 56 at entry point 70. In accordance with this example embodiment, compressor part 20 of charging device 18 has to be larger, since a portion of the quantity of fresh air conveyed is required by way of the cooling of air-gap-insulated exhaust-carrying component 44.

The quantity of air used to cool air-gap-insulated exhaust-carrying component 44 may be adjusted by way of the position of first regulating valve 24. Compared with the variant illustrated in FIG. 1, the installation site of air mass meter 14 has been changed. Air mass meter 14 is installed downstream of the branch for cooling of air-gap-insulated exhaust-carrying component 44 since otherwise the exact determination of the air entering the combustion chamber of cylinders Z1, Z2, Z3 and Z4, which is important for controlling internal combustion engine 10, is not possible.

In accordance with the example embodiments illustrated in FIGS. 1 and 2, charge pressure regulation of charging device 18 may be effected by way of first regulating valve 24, and therefore an additional wastegate 52 is not absolutely essential.

Figure 3:
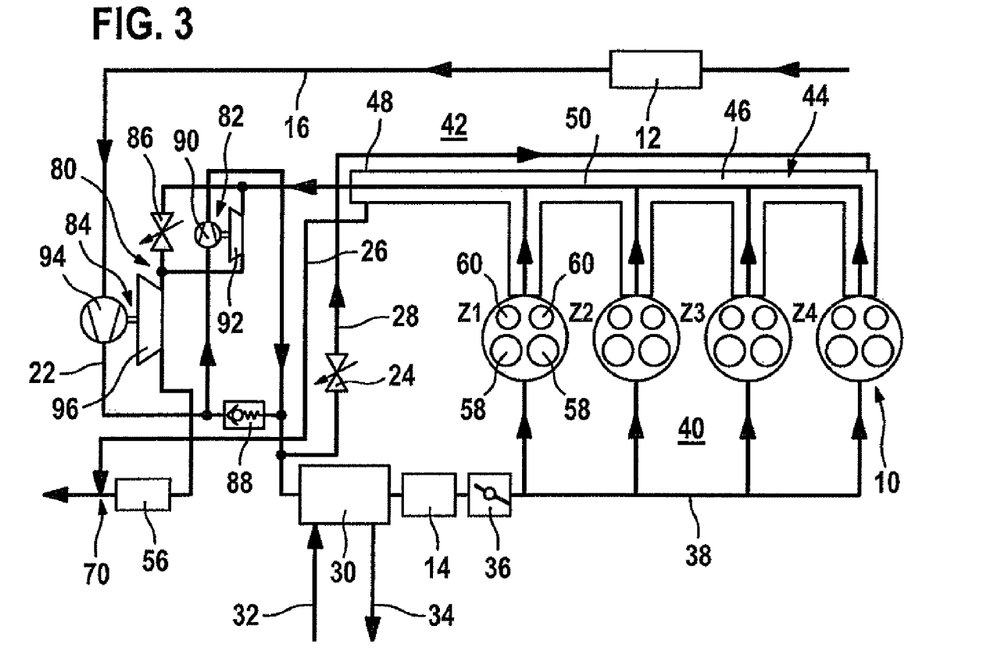
FIG. 3 is a flow diagram of a further example embodiment having a two-stage charging device and a feed line with regulating valve for feeding cooling air to the exhaust-carrying components.

FIG. 3 shows a further example embodiment of a flow diagram of an internal combustion engine with two-stage charging device and exhaust gas cooling.

In the illustration shown in FIG. 3, the one-stage charging device 18 illustrated in FIGS. 1 and 2 has been replaced by a two-stage charging device 80. Two-stage charging device 80 includes a first exhaust gas turbocharger 82 and a second exhaust gas turbocharger 84. First exhaust gas turbocharger 82 is smaller compared with second exhaust gas turbocharger 84. In low load or engine speed ranges of internal combustion engine 10, and hence when the quantity of exhaust gas obtained is lower, a regulating flap valve 86 is closed, with the result that the stream of exhaust gas produced by internal combustion engine 10 is directed via the smaller, first exhaust gas turbocharger 82. When the quantity of exhaust gas increases with rising engine speeds of internal combustion engine 10, regulating flap valve 86 is opened, with the result that exhaust gas is also passed via second exhaust gas turbocharger 84 of two-stage charging device 80.

By way of the position of regulating flap valve 86 it is possible to adjust the distribution of exhaust gas in any desired manner, so that the two exhaust gas turbochargers 82, 84 are always operated at a favorable operating point.

For the sake of completeness it should be mentioned that first exhaust gas turbocharger 82 has a first compressor part 90 and a first turbine part 92, and second exhaust gas turbocharger 84 includes a compressor part 94 and a turbine part 96. The fresh air passes via first line 16 with air filter 12 mounted therein to compressor part 94 of second exhaust gas turbocharger 84. From there, the pre-compressed fresh air is passed via second line 22 to compressor part 90 of first exhaust gas turbocharger 82 and flows via charge air cooler 30, air mass meter 14 and throttle valve 36 to fifth line 38 and, from there, to individual cylinders Z1, Z2, Z3 and Z4 of internal combustion engine 10. Upstream of the entrance to charge air cooler 30, fourth line 28 branches off, which is the line through which the pre-compressed fresh air is supplied to air-gap-insulated exhaust-carrying component 44. The pre-compressed fresh air enters outer chamber 46 of air-gap-insulated exhaust-carrying component 44, which chamber is delimited by outer wall 48 and inner wall 50. The pre-compressed fresh air heated by cooling of the exhaust gas flows out of outer chamber 46 via third line 26 to the exhaust train of the internal combustion engine and is fed into the exhaust train downstream of catalytic converter 56 at entry point 70.

In the case of a large quantity of air conveyed through compressor part 94 of second exhaust gas turbocharger 84, the pressure upstream of first exhaust gas turbocharger 82 rises to such a great extent that a bypass valve 88 opens and the pre-compressed fresh air 54 flowing in second line 22 passes directly to charge air cooler 30 and into fourth line 28 leading to first regulating valve 24, bypassing first exhaust gas turbocharger 82. To cool air-gap-insulated exhaust-carrying component 44, first regulating valve 24 is opened and a quantity of pre-compressed air corresponding to the degree of opening of first regulating valve 24 reaches air-gap-insulated exhaust-carrying component 44.

Figure 4:
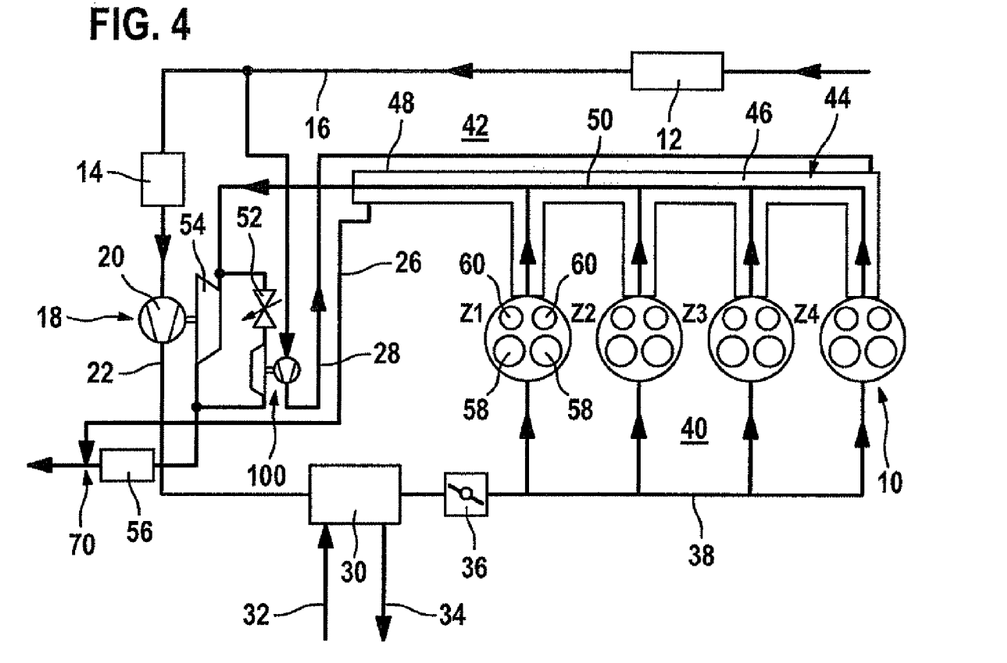
FIG. 4 is a flow diagram of an example embodiment having a charging device in which a separate turbocharger is used to deliver the quantity of air required for cooling.

FIG. 4 shows an example embodiment of an internal combustion engine with charging device and exhaust gas cooling with a separate charging device.

As shown in the flow diagram illustrated in FIG. 4, a separate charging device 100 is used to convey cooling air for air-gap-insulated exhaust-carrying component 44.

In the direction of flow of the exhaust gas stream leaving air-gap-insulated exhaust-carrying component 44, separate charging device 100 is situated downstream of wastegate 52. The stream of exhaust gas fed past charging device 18 via wastegate 52 in the upper load range of internal combustion engine 10 is fed to the turbine part of separate charging device 100 and is used to compress the cooling air. The quantity of the exhaust gas stream that is directed via separate charging device 100, and hence the quantity of the conveyed air used to cool air-gap-insulated exhaust-carrying component 44, is regulated by way of the position of wastegate 52. Independently of charging device 18, separate charging device 100 is fed with fresh air via a branch from first line 16, which fresh air is fed, after compression in separate charging device 110, via fourth line 28 into outer chamber 46 of air-gap-insulated exhaust-carrying component 44. The pre-compressed fresh air leaving outer chamber 46 of air-gap-insulated exhaust-carrying component 44 has a higher temperature due to absorption of heat in outer chamber 46, and flows via third line 26, which discharges at entry point 70 downstream of catalytic converter 56, into the exhaust train of internal combustion engine 10. In this example embodiment, air mass meter 14 is disposed upstream of charging device 18 in second line 22 and therefore does not measure the quantity of air flowing toward separate charging device 100, which after all is not fed to internal combustion engine 10 for combustion but serves merely to cool air-gap-insulated exhaust-carrying component 44 in the upper engine speed range of internal combustion engine 10. The position of air mass meter 14 upstream of compressor part 20 of charging device 18 reduces the risk of fouling of air mass meter 14.

Figure 5:
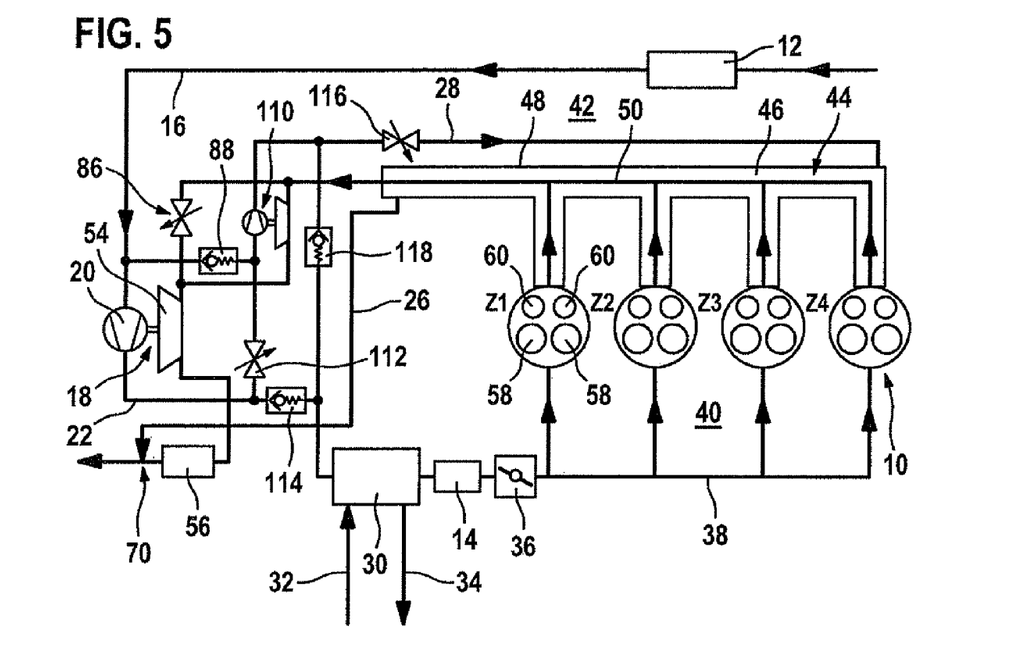
FIG. 5 shows an example embodiment having a two-stage charging device, wherein a small exhaust gas turbocharger is used to deliver the cooling air in the upper load and engine speed range.

As shown in the illustration of FIG. 5, a further example embodiment of a charging device with exhaust gas cooling is employed in internal combustion engines, in this case a separate charging device being used as an additional charging device for the internal combustion engine.

In accordance with the flow diagram illustrated in FIG. 5, the arrangement shown involves "staged charging" wherein, in the upper engine speed and load range of the internal combustion engine, a separate charging device 110 may be connected in the circuit in such a manner that it may be used to cool air-gap-insulated exhaust-carrying component 44. At low engine speeds of internal combustion engine 10, and hence when the quantity of exhaust gas is small, regulating flap valve 86 is closed, with the result that the stream of exhaust gas coming from internal combustion engine 10 is passed via separate charging device 110. When the quantity of exhaust gas increases, that is, as the engine speed of internal combustion engine 10 increases, regulating flap valve 86 is opened, with the result that exhaust gas also flows via charging device 18 or rather its turbine part 54. By way of the position of regulating flap valve 86 the distribution of the exhaust gas stream between separate charging device 110, which preferably also is configured as an exhaust gas turbocharger, and charging device 18, which includes a turbine part 54 and compressor part 20, may be adjusted in any desired manner such that the two exhaust gas turbochargers always operate at their most favorable operating point.

In the example embodiment illustrated in FIG. 5, the fresh air passes via air filter 12 and first line 16 to compressor part 20 of charging device 18 and, from there, via second line 22 and, from there, via a first switching valve 112 to the compressor part of separate charging device 110 or via a first non-return valve (bypass) 114 to charge air cooler 30. From charge air cooler 30 the air flows via air mass meter 14 and throttle valve 36 to fifth line 38 and, from there, to intake side 40 of cylinders Z1, Z2, Z3 and Z4 of internal combustion engine 10. In the case of a large quantity of air, the pressure upstream of separate charging device 110 rises to such an extent that valve 114 opens and the air reaches air mass meter 14 directly, bypassing separate charging device 110.

In the upper load range of internal combustion engine 10, regulating flap valve 86 is normally open so wide that hardly any exhaust gas flows via separate charging device 110. If air-gap-insulated exhaust-carrying component 44 is to be cooled in the upper load range of internal combustion engine 10, regulating flap valve 86 is moved into the closed position with the result that, from then on, a part-stream of the exhaust gas then flows via the turbine part of separate charging device 110. At the same time, first switching valve 112 is closed. The fresh air then passes via bypass valve 88 directly via air filter 12, first line 16 to separate charging device 110. A second switching valve 116, which is mounted in fourth line 28, is opened, with the result that pre-compressed fresh air passes from separate charging device 110, which acts as an additional charger, to air-gap-insulated exhaust-carrying component 44. Bypass valve 88 prevents charging device 18 from not conveying in a loop when first switching valve 112 is open. A second non-return valve 118 prevents charging device 18 from delivering directly into outer chamber 46 of air-gap-insulated exhaust-carrying component 44.

Figure 6:
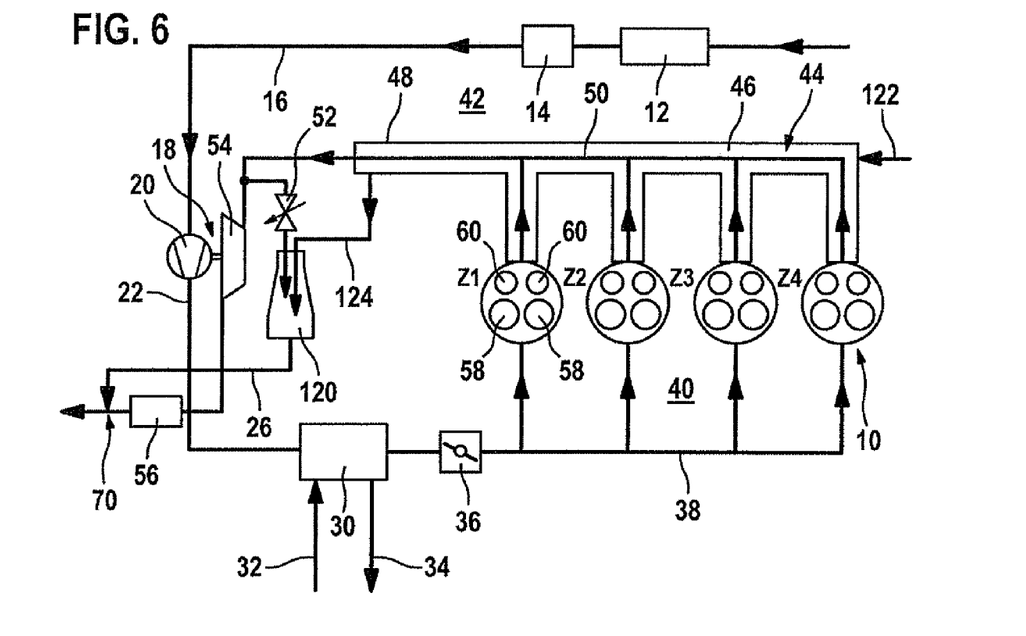
FIG. 6 shows a charging device that is of a one-stage construction and in which, as a further variant, a suction jet pump is used instead of a further turbocharger, with the quantity of cooling air fed to the exhaust-carrying components being introduced downstream of the catalytic converter.

From the illustration shown in FIG. 6 a further example embodiment will be seen in which a charging device for an internal combustion engine is illustrated, the exhaust gas of the internal combustion engine being cooled and the charging device being assigned a suction jet pump.

From the illustration shown in FIG. 6 it will be seen that a suction jet pump 120 is assigned to charging device 18, which includes compressor part 20 and turbine part 54. Suction jet pump 120 is situated downstream of wastegate 52 and includes a feed line 124 through which heated outside air from outer chamber 46 of air-gap-insulated exhaust-carrying component 44 enters suction jet pump 120. That fresh air component and the component of exhaust gas fed to suction jet pump 120 via wastegate 52 according to the opening position thereof are fed via third line 26 into the exhaust train of internal combustion engine 10 downstream of catalytic converter 56 at the entry point 70. As a modification of the previous example embodiment, air-gap-insulated exhaust-carrying component 44 according to the example embodiment illustrated in FIG. 6 includes an outside air feed line 122. At high load, exhaust gas leaving air-gap-insulated exhaust-carrying component 44 is fed via wastegate 52 past turbine part 54 of charging device 18. That exhaust gas enters suction jet pump 120. The fresh air leaving outer chamber 46 of air-gap-insulated exhaust-carrying component 44 is also directed into suction jet pump 120. In accordance with this example embodiment, suction jet pump 120 is so configured that, owing to the stream of exhaust gas, a negative pressure is produced in the line leading from outer chamber 46 of air-gap-insulated exhaust-carrying component 44 to suction jet pump 120. Accordingly, a negative pressure is also produced in outer chamber 46 of air-gap-insulated exhaust-carrying component 44. Via outside air line 122, however, air is continuously able to flow in behind into outer chamber 46 in order to cool inner wall 50 of air-gap-insulated exhaust-carrying component 44. After being fed 124 into suction jet pump 120, that air is passed into the exhaust train together with the exhaust gas fed past turbine part 54 of charging device 18 via wastegate 52. That gas stream leaving suction jet pump 120 via third line 26 is either fed into the exhaust train downstream of catalytic converter 56 at entry point 70 or may also be fed into the exhaust train of internal combustion engine 10 upstream of catalytic converter 56.

Figure 7:
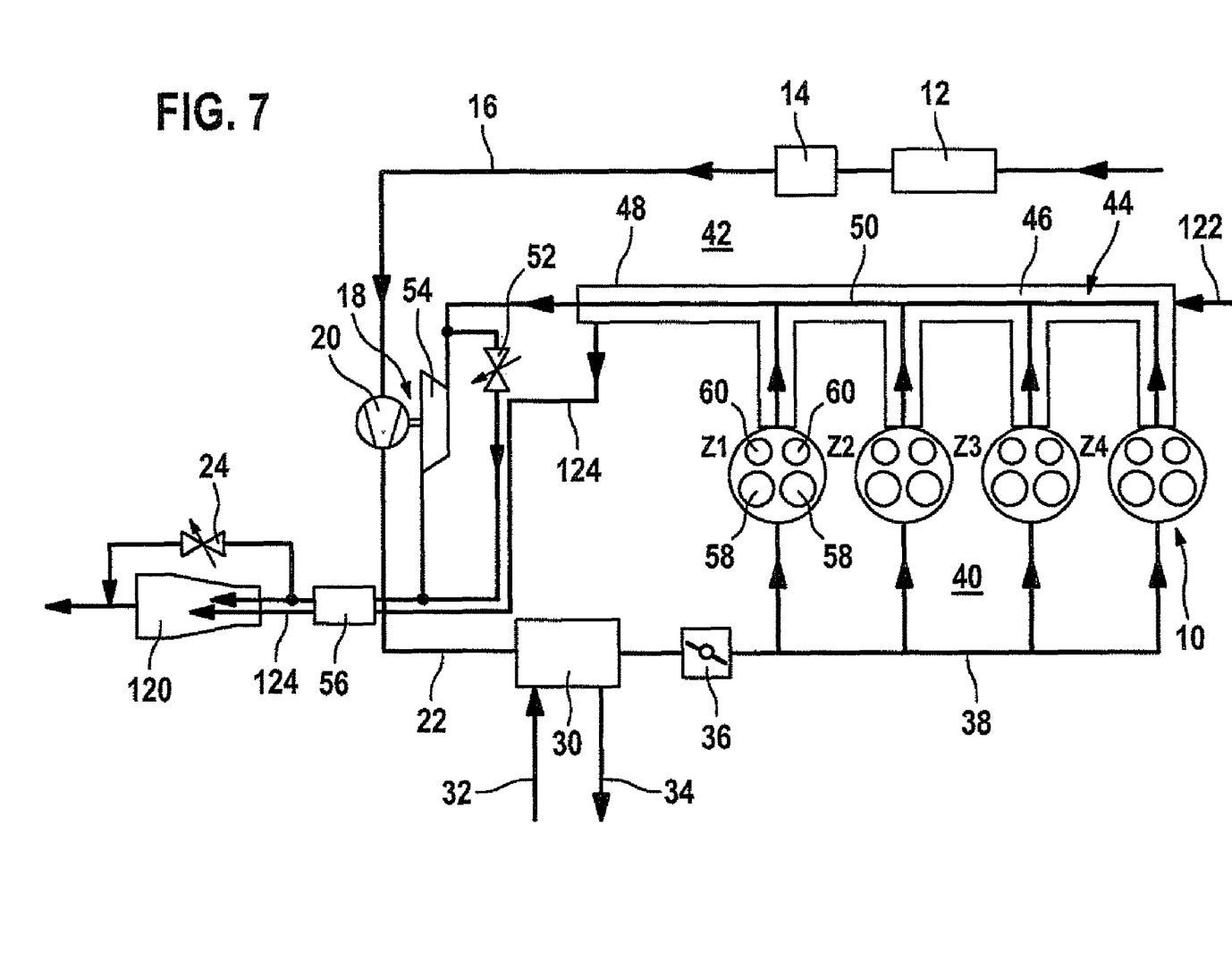
FIG. 7 shows a charging device that is a one-stage charging device and in which, as a further variant, a suction jet pump, disposed downstream of the catalytic converter, is used instead of a further exhaust gas turbocharger.

From the illustration shown in FIG. 7 it will be seen that a suction jet pump 120 is assigned to charging device 18, which includes a compressor part 20 and turbine part 54. Suction jet pump 120 is situated downstream of catalytic converter 56 and includes a feed line 124 through which heated outside air from outer chamber 46 of air-gap-insulated exhaust-carrying component 44 enters suction jet pump 120. As a modification of the example embodiments described above, in accordance with the example embodiment illustrated in FIG. 7 air-gap-insulated exhaust-carrying component 44 includes an outside air line 122. Using the actuator of regulating valve 12 it is possible to adjust how much exhaust gas enters suction jet pump 120. In that manner, it is also possible to control how much fresh air is conveyed through outer chamber 46 of air-gap-insulated exhaust-carrying component 44. The fresh air leaving outer chamber 46 of air-gap-insulated exhaust-carrying component 44 is also directed into suction jet pump 120. In accordance with the example embodiment illustrated in FIG. 7, suction jet pump 120 is so configured that, owing to the stream of exhaust gas, a negative pressure is produced in the section of the line leading from outer chamber 46 of air-gap-insulated exhaust-carrying component 44 to suction jet pump 120. Accordingly, a negative pressure is also obtained in outer chamber 46 of air-gap-insulated exhaust-carrying component 44. Via outside air feed line 122 air is continuously able to flow in behind into outer chamber 46 in order to cool inner wall 50 of air-gap-insulated exhaust-carrying component 44.

What is claimed is:

1. A charging device for an internal combustion engine, comprising:
   at least a first line configured to intake of fresh air, the fresh air flowing via the first line to a compressor part of the charging device and the fresh air flowing from the compressor part via a second line to the combustion engine;
   at least one air-gap-insulated exhaust-carrying component disposed at an outlet side of the internal combustion engine; and
   at least one first regulating element configured to distribute an exhaust gas stream;
   wherein the air-gap-insulated exhaust-carrying component includes an outer chamber through which a controllable stream of fresh air is flowable;
   wherein, via a fourth line, the outer chamber is acted upon by a stream of pre-compressed fresh air;
   wherein a quantity of the pre-compressed fresh air supplied to the outer chamber is adjustable at a second regulating element; and
   wherein the pre-compressed fresh air flowing out of the outer chamber is fed via a third line into a charge air cooler.

2. The charging device according to claim 1, wherein the outer chamber is delimited by an outer wall and by an inner wall spaced from the outer wall.

3. The charging device according to claim 1, wherein the charging device is constructed as an exhaust gas turbocharger including a compressor part and a turbine part.

4. A charging device for an internal combustion engine, comprising:
   at least a first line configured to intake of fresh air, the fresh air flowing via the first line to a compressor part of the charging device and the fresh air flowing from the compressor part via a second line to the combustion engine;
   at least one air-gap-insulated exhaust-carrying component disposed at an outlet side of the internal combustion engine; and
   at least one first regulating element configured to distribute an exhaust gas stream;
   wherein the air-gap-insulated exhaust-carrying component includes an outer chamber through which a controllable stream of fresh air is flowable;
   wherein, via a fourth line, the outer chamber is acted upon by a stream of pre-compressed fresh air;
   wherein the pre-compressed fresh air is supplied to the outer chamber depending on a position of the first regulating element for distribution of the exhaust gas stream between a first exhaust gas turbocharger and a second exhaust gas turbocharger of a multi-stage charging device and depending on the position of a second regulating element of the fourth line.

5. A charging device for an internal combustion engine, comprising:
   at least a first line configured to intake of fresh air, the fresh air flowing via the first line to a compressor part of the charging device and the fresh air flowing from the compressor part via a second line to the combustion engine;
   at least one air-gap-insulated exhaust-carrying component disposed at an outlet side of the internal combustion engine; and
   at least one first regulating element configured to distribute an exhaust gas stream;
   wherein the air-gap-insulated exhaust-carrying component includes an outer chamber through which a controllable stream of fresh air is flowable;
   wherein, via a fourth line, the outer chamber is acted upon by a stream of pre-compressed fresh air;
   wherein, depending on a position of the first regulating element for distribution of the exhaust gas stream, the pre-compressed fresh air is supplied to the outer chamber via a separate charging device.

6. The charging device according to claim 5, wherein fresh air is supplied to the separate charging device via a branch from the first line.

7. A charging device for an internal combustion engine, comprising:
   at least a first line configured to intake of fresh air, the fresh air flowing via the first line to a compressor part of the charging device and the fresh air flowing from the compressor part via a second line to the combustion engine;
   at least one air-gap-insulated exhaust-carrying component disposed at an outlet side of the internal combustion engine; and
   at least one first regulating element configured to distribute an exhaust gas stream;
   wherein the air-gap-insulated exhaust-carrying component includes an outer chamber through which a controllable stream of fresh air is flowable;
   wherein, via a fourth line, the outer chamber is acted upon by a stream of pre-compressed fresh air;
   wherein the pre-compressed fresh air is supplied to the outer chamber via a separate charging device which is connected upstream of a first switching valve and which is operated depending on a position of the first regulating element for distribution of the exhaust gas stream, the quantity of pre-compressed fresh air being controllable by a second switching valve.

8. A charging device for an internal combustion engine, comprising:
   at least a first line configured to intake of fresh air, the fresh air flowing via the first line to a compressor part of the charging device and the fresh air flowing from the compressor part via a second line to the combustion engine;
   at least one air-gap-insulated exhaust-carrying component disposed at an outlet side of the internal combustion engine; and
   at least one first regulating element configured to distribute an exhaust gas stream;
   wherein the air-gap-insulated exhaust-carrying component includes an outer chamber through which a controllable stream of fresh air is flowable;
   wherein when the outer chamber is acted upon by a negative pressure, fresh air flows into it via an outside air feed line;
   wherein the negative pressure in the outer chamber is produced by a portion of the exhaust gas stream flowing through a suction jet pump through which a part-stream of the exhaust gas stream flows depending on a position of the first regulating element.

* * * * *

UNITED STATES PATENT AND TRADEMARK OFFICE
CERTIFICATE OF CORRECTION

PATENT NO.       : 8,365,519 B2                                                                     Page 1 of 1
APPLICATION NO. : 12/282964
DATED            : February 5, 2013
INVENTOR(S)      : Wirbeleit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this
First Day of September, 2015

Michelle K. Lee
*Director of the United States Patent and Trademark Office*